Feb. 8, 1944.   J. J. N. VAN HAMERSVELD   2,340,912
MACHINE TOOL
Filed Nov. 20, 1940    7 Sheets-Sheet 2
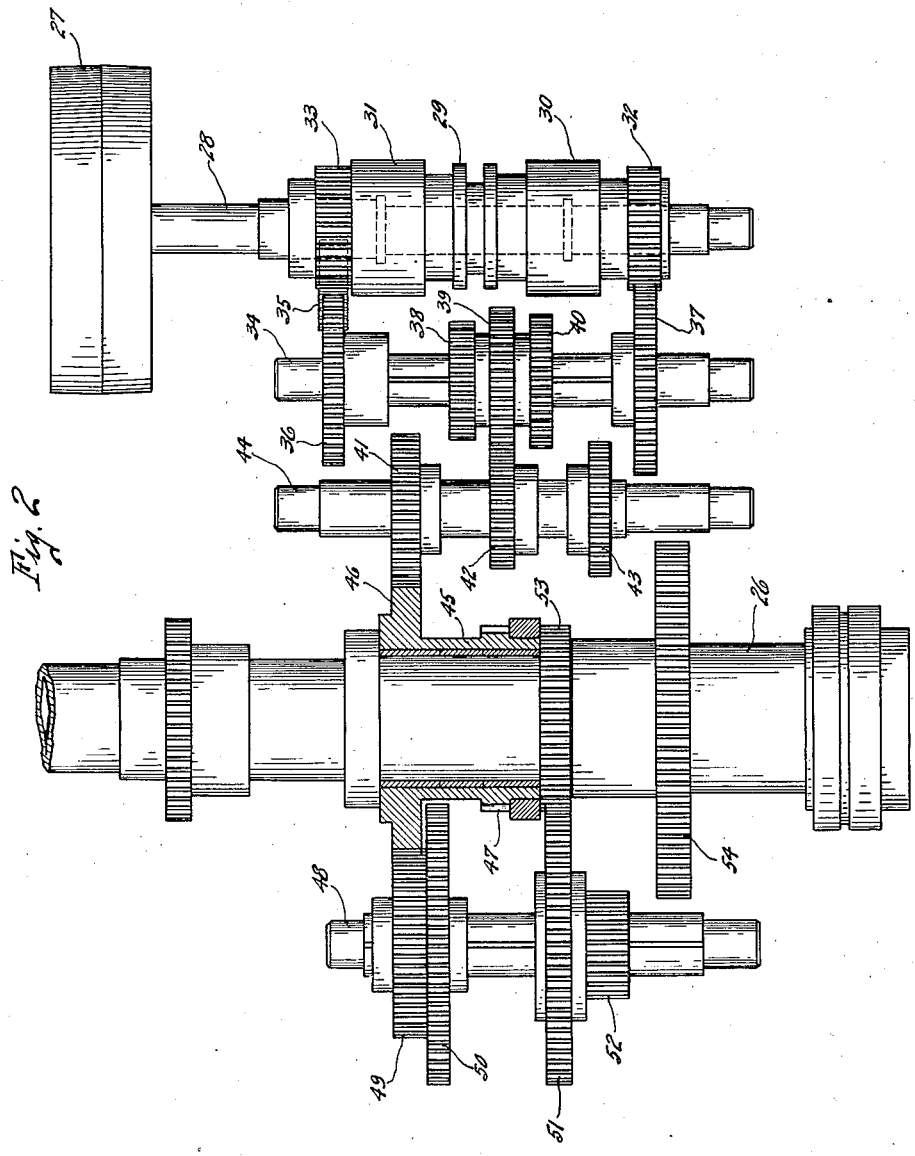
INVENTOR.
JOHN J. N. VAN HAMERSVELD
BY
Kwis Hudson & Kent
ATTORNEYS Feb. 8, 1944.  J. J. N. VAN HAMERSVELD  2,340,912
MACHINE TOOL
Filed Nov. 20, 1940  7 Sheets-Sheet 3
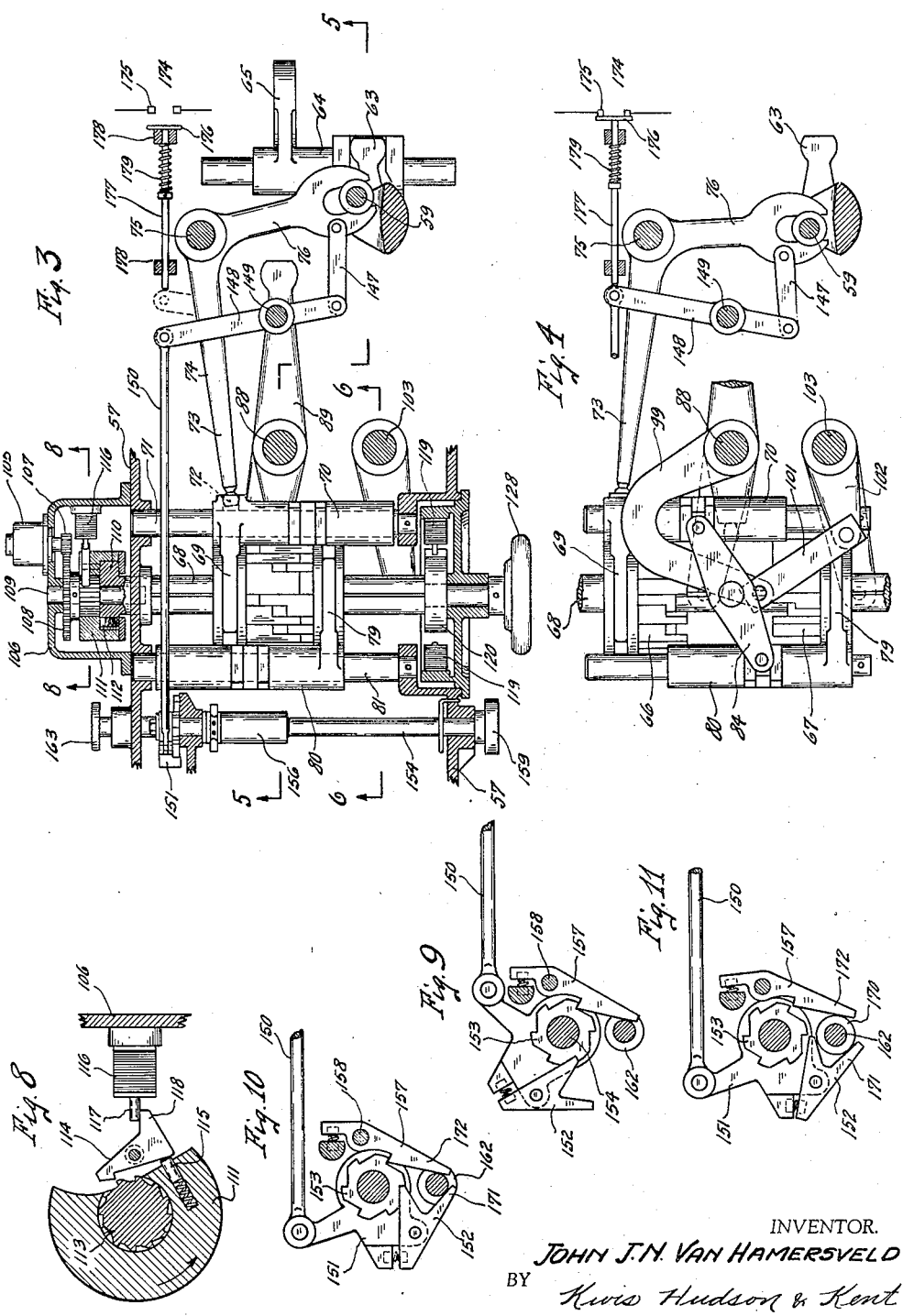
INVENTOR.
JOHN J. N. VAN HAMERSVELD
BY
Kwis Hudson & Kent
ATTORNEYS

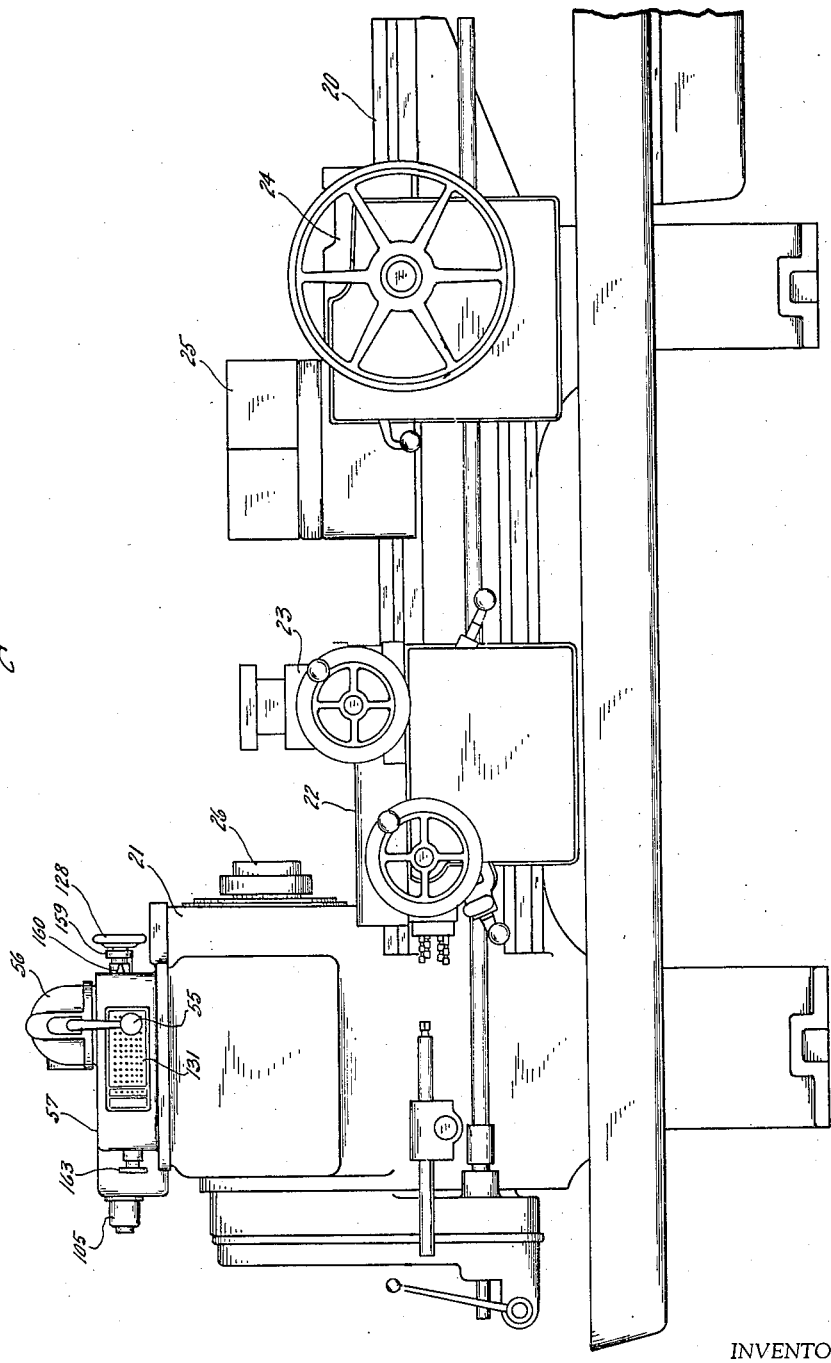

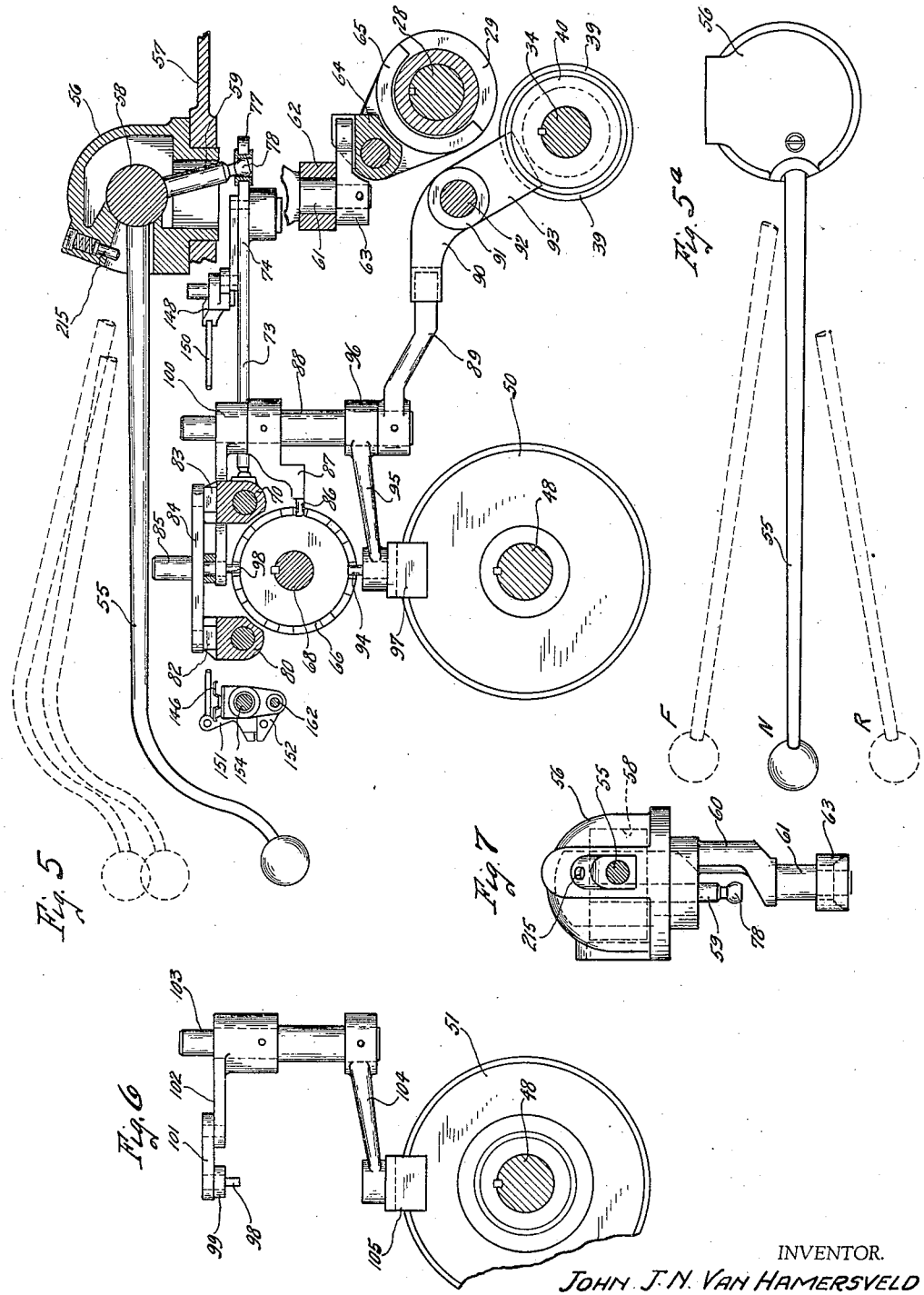

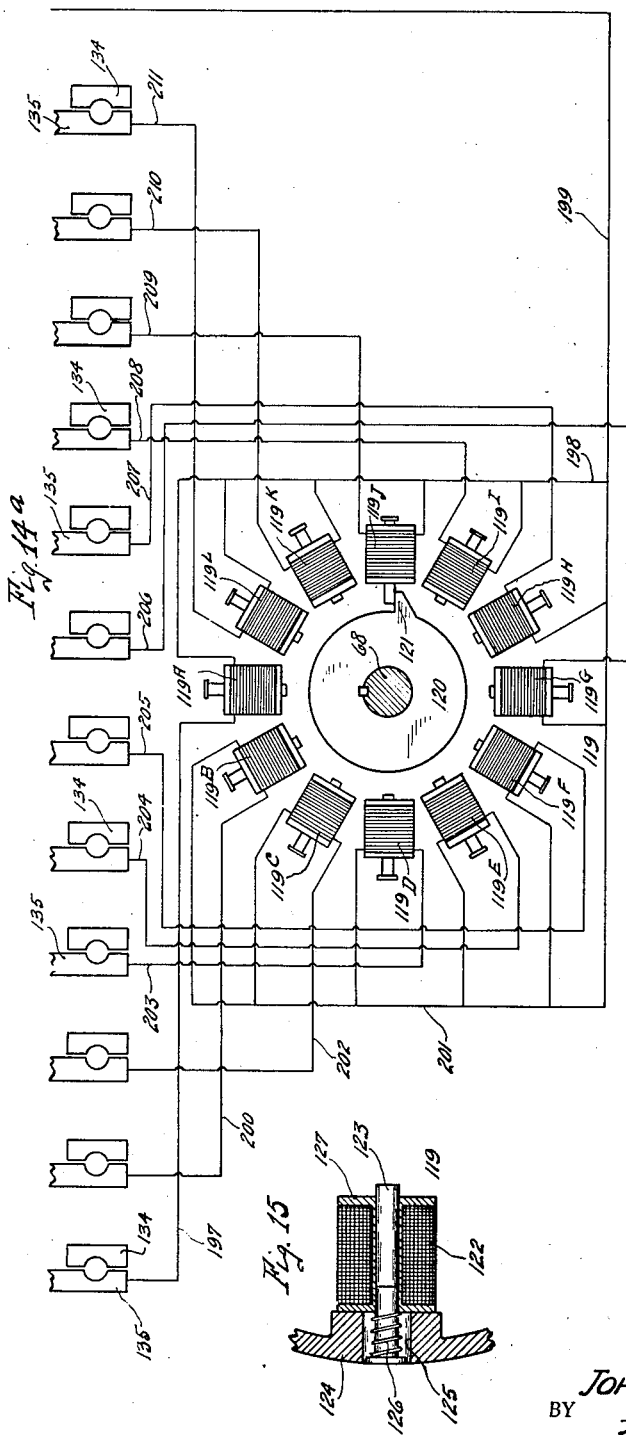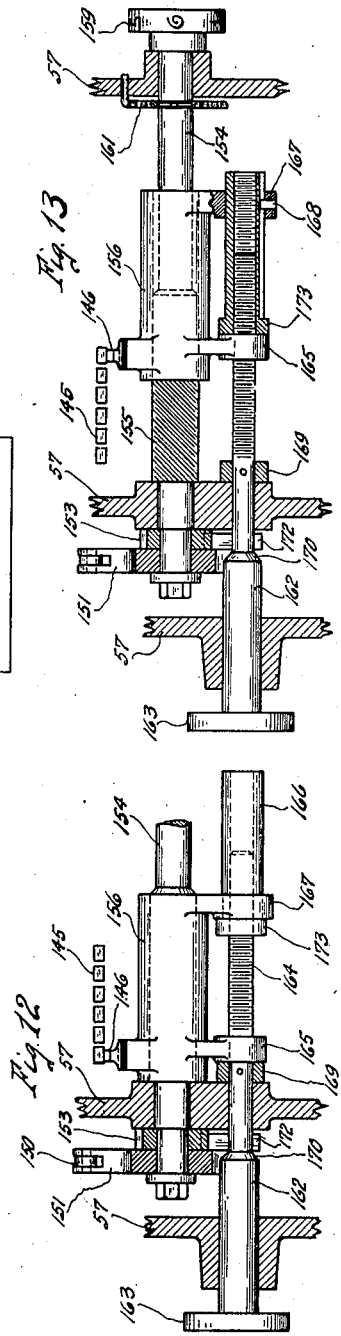

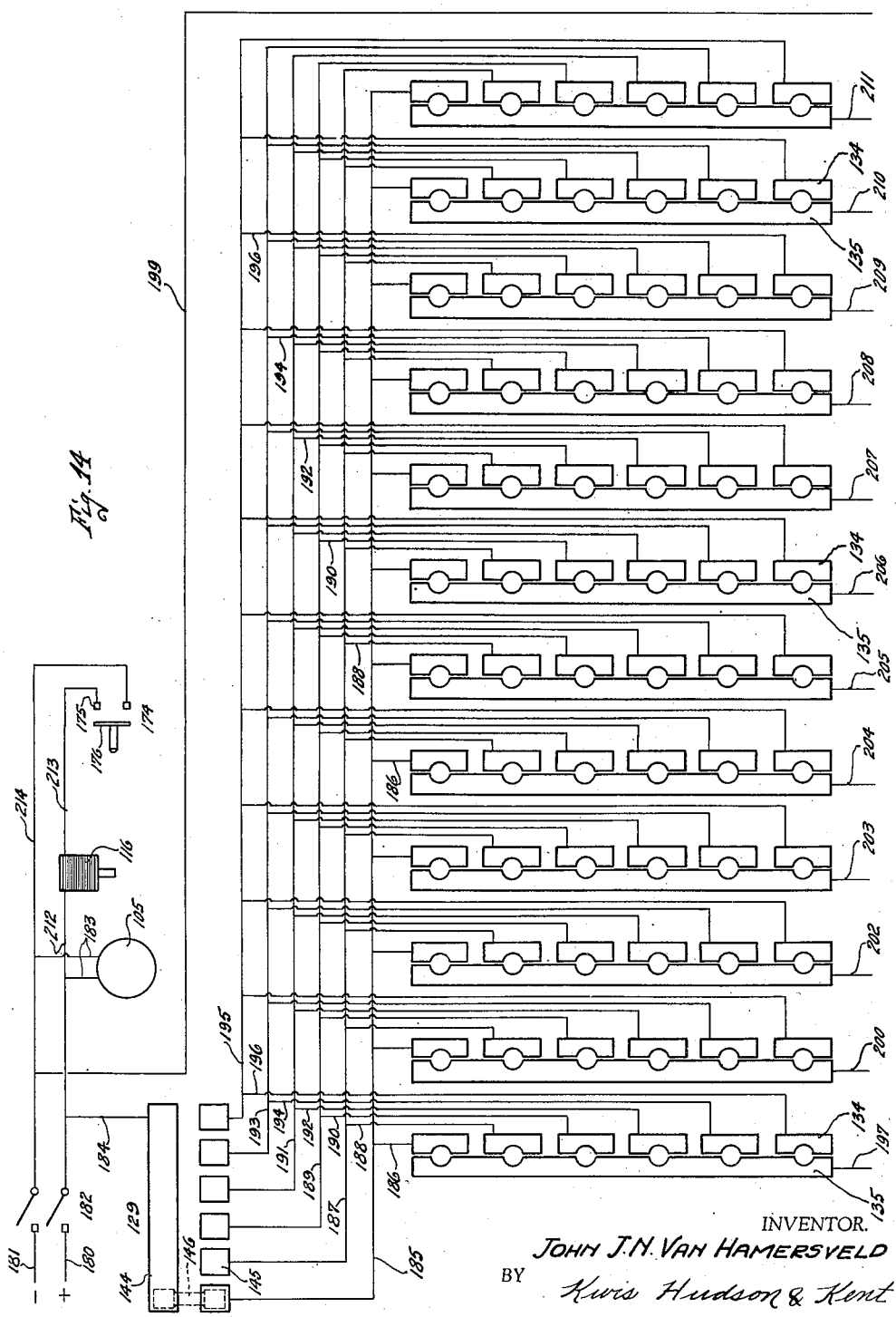

Feb. 8, 1944. J. J. N. VAN HAMERSVELD 2,340,912
MACHINE TOOL
Filed Nov. 20, 1940 7 Sheets-Sheet 7
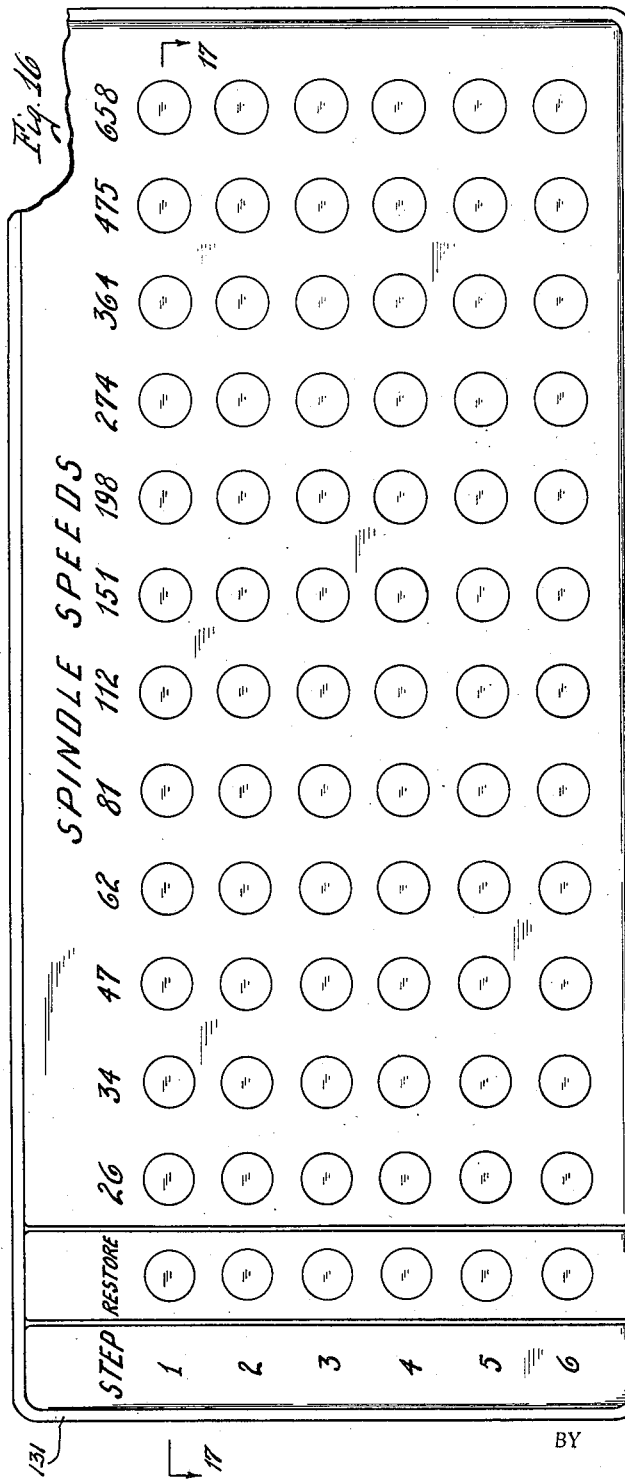
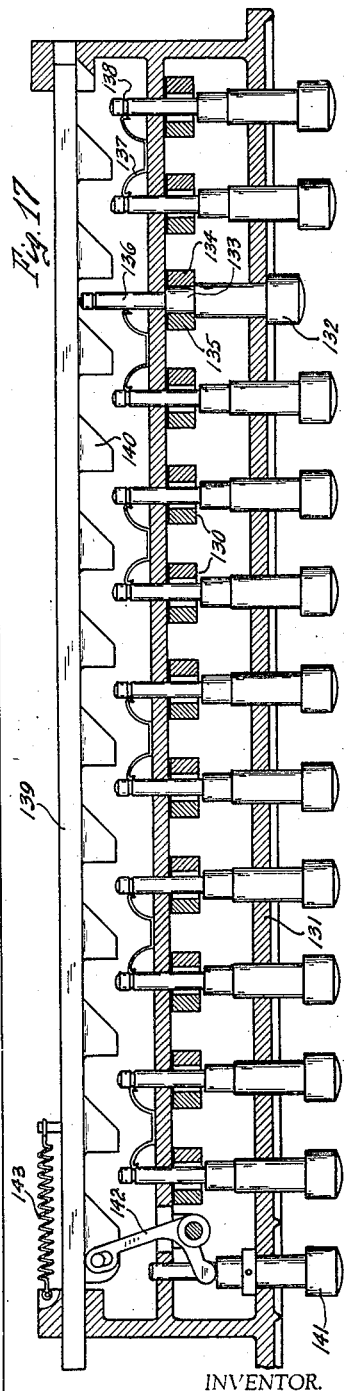
INVENTOR.
JOHN J. N. VAN HAMERSVELD
BY
Kwis Hudson & Kent
ATTORNEYS Patented Feb. 8, 1944

2,340,912

UNITED STATES PATENT OFFICE 2,340,912

MACHINE TOOL

John J. N. Van Hamersveld, Cleveland Heights, Ohio, assignor to The Warner & Swasey Company, Cleveland, Ohio, a corporation of Ohio Application November 20, 1940, Serial No. 366,437

8 Claims. (Cl. 82—29)

This invention relates to machine tools and particularly to an improved mechanism by which the rates of movement of a part of the machine tool which is adapted to be moved at different rates may be selected or preselected for all the different steps of a work cycle.

Machine tools having selecting or preselecting mechanism by which the rates of movement of a part of the machine tool, such as the spindle, the cross-slide, the cross-slide carriage, or the turret saddle, may be selected or preselected are well known. Examples of such machine tools having selecting or preselecting mechanism are the machine tools disclosed in Patent No. 2,068,552 issued January 19, 1937, in the name of Max E. Lange, and Patent No. 2,169,748 issued August 15, 1939, in the name of John J. N. Van Hamersveld.

The selecting or preselecting mechanism as illustrated in these patents and others well known in the art involves members which are adapted to be given an indexing movement to select or preselect the rate for the movable part and then an actuating movement to obtain the selected or preselected rate by shifting the desired element or elements of the transmission utilized in imparting different rates of movement to the movable part.

Generally the indexible members are indexed manually and are then given their actuating movement to effect the change in the rate of movement, by the movement of a control lever. In the Lange patent referred to the indexible members are rotated by power and the rotative movement of the indexible members is stopped by the manual disengagement of said power at the time said indexible members have reached a desired position, and in that respect the mechanism of the Lange patent might be included in the class or group wherein the indexing is accomplished manually.

The principal object of the present invention is to provide a selecting or preselecting mechanism by which the indexing of the indexible members is facilitated and to provide an actuating and controlling means for imparting indexing movements of such a nature that after a rate of movement has been selected or rates of movement for several or all of the steps of the work cycle have been preselected by the actuation of button switches or equivalent members, the indexing movement or movements will take place automatically merely by the manipulation of the control lever.

A further object is to accomplish the automatic indexing of the indexible members by electrical means associated with the selecting or preselecting elements, such as push button switches, designed to be actuated to select or preselect the rates of movement for all the steps of the work cycle.

The invention may be further briefly summarized as consisting in certain details of construction and combinations and arrangements of parts which will be described in the specification and set forth in the appended claims.

In the accompanying sheets of drawings, the invention is illustrated by way of example only as applied to the transmission for changing the rates of movement of the work spindle of a machine tool, and in the embodiment illustrated provision is made for imparting twelve different rates of movement to the work spindle for a work cycle composed of six operating steps. It is to be understood, however, that the particular number of rates of movement which may be imparted to the work spindle and also the number of steps of the work cycle are also by way of example only.

In the drawings,

Fig. 1 is a side elevation of a machine tool here illustrated as a turret lathe;

Fig. 2 is a diagrammatic view of the transmission employed in the head of the lathe for giving the spindle the desired rate of movement;

Fig. 3 is a horizontal sectional view taken through the head illustrating the indexible members here shown as so-called spools together with the mechanism for operatively connecting the spools to the shiftable elements of the transmission;

Fig. 4 is a view similar to Fig. 3 but showing the shiftable members and some of the associated parts in a different position than illustrated in Fig. 3 and also omitting some of the parts of Fig. 3;

Fig. 5 is a transverse sectional view of the mechanism shown in Fig. 3 taken substantially along the irregular line 5—5 of Fig. 3;

Fig. 5a is a top plan view of the control lever and its mounting, and indicates by dotted lines the positions of the lever for forward and reverse rotation of the spindle and by full lines its neutral position;

Fig. 6 is a tranverse sectional view substantially along the line 6—6 of Fig. 3;

Fig. 7 is a detached view of part of the mechanism of Fig. 5 as viewed from the left;

Fig. 8 is an enlarged fragmentary sectional view taken substantially along the line 8—8 of Fig. 3;

Figs. 9, 10, and 11 are enlarged fragmentary detail views illustrating certain parts shown in Fig. 3, with the parts in Figs. 10 and 11 in different positions than in Fig. 9;

Fig. 12 is a detached view on an enlarged scale showing some of the mechanism illustrated in Fig. 3;

Fig. 13 is a similar view with the parts in a different position than in Fig. 12 and illustrating some parts omitted from Fig. 12;

Figs. 14 and 14a (the latter being a continuation of Fig. 14) constitute a diagrammatic view of the switch mechanism, the electromotive devices, and the circuit connections between the same;

Fig. 15 is an enlarged sectional view through one of the motive devices illustrated in Fig. 14a;

Fig. 16 is a view of the switch panel for the manually operated switches indicated diagrammatically in Figs. 14 and 14a; and Fig. 17 is a horizontal sectional view of the switch panel substantially along the line 17—17 of Fig. 16.

Referring now to the drawings, in Fig. 1 I have shown my invention applied to a turret lathe, but of course it will have utility in many other different types of machine tools. Furthermore, while I have shown my invention applied to the work spindle of a lathe, it may, as before stated, be applied to other parts which are to be actuated at different rates, as, for example, the cross-slide carriage, the cross-slide, and the turret saddle. Accordingly, the term "movable part of a machine tool" as used herein will apply to any movable part which is to be driven or moved at varying rates of speed or feed, such as those above mentioned or comparable parts of any machine tool in connection with which the invention finds utility.

The lathe illustrated in Fig. 1 has a bed 20, a headstock 21, a cross-slide carriage 22 having a transversely movable cross-slide 23, and a turret saddle 24 carrying a turret 25. The work spindle 26 which is supported by the headstock 21 is adapted to be driven at varying speeds by a transmission to which power may be applied in any suitable manner, but in this instance by means of a belt pulley 27 secured to a shaft 28. This shaft is provided with a shiftable clutch member 29 which is splined to the shaft and arranged on opposite sides of this clutch member are suitable cooperating clutch members 30 and 31 which are freely rotatable on shaft 28 and which together with the clutch member 29 constitute in this instance friction clutches, either part 30 or part 31 being adapted to be frictionally engaged with or otherwise clutched to the clutch member 29 for either forward or reverse rotation in the well known manner.

The clutch member 30 has fixed to it a gear 32 for forward rotation of the spindle and the clutch member 31 has fixed to it a gear 33 for reverse rotation of the spindle. Power is transmitted from shaft 28 to shaft 34 of the transmission through the medium of an idler gear 35 which engages the gear 33 and also a gear 36 which is fixed to shaft 34. Through the gears 33, 35, and 36 the shaft 34 will be rotated in the reverse direction. Forward rotation is transmitted from shaft 28 to shaft 34 from gear 32 to gear 37 fixed to shaft 34.

Shiftable along the shaft 34 and splined thereto and arranged between the gears 36 and 37 is a three-step gear cone consisting of gears 38, 39, and 40 which are adapted to engage, respectively, gears 41, 42, and 43 fixed to a shaft 44 of the transmission. By shifting the gear cone composed of gears 38, 39, and 40 to its three different positions on shaft 34, shaft 44 can be driven at three different rates either in forward or reverse. Rotation is transmitted from shaft 44 to a sleeve 45 which turns loosely on the work spindle 26 by the engagement of gear 41 on shaft 44 with a gear 46 carried by sleeve 45. The sleeve 45 also has a second gear 47.

Rotation is transmitted from the sleeve 45 to a shaft 48 of the transmission which shaft has a rear two-step gear cone composed of gears 49 and 50 and a front two-step gear cone composed of gears 51 and 52 both gear cones being splined to the shaft 48. The gear 46 on sleeve 45 is adapted to mesh with gear 49 of the rear two-step gear cone when the two-step gear cone is in one position, and gear 47 is adapted to mesh with gear 50 when the gear cone is in the other position. The gear 51 of the forward two-step gear cone is adapted to mesh with gear 53 secured to the work spindle 26 and the gear 52 of this gear cone is adapted to mesh with the gear 54 which also is secured to the work spindle 26. Thus by the transmission herein illustrated the spindle can be rotated either in a forward or in a reverse direction at twelve different rates.

The headstock has a single control lever 55 which is adapted for both horizontal and vertical movements, as indicated in Figs. 5 and 5a, and is pivotally supported in a rockable housing 56 which is carried by the cover 57 of the headstock, the cover being shown in Fig. 1 and a portion thereof in Fig. 5. There is journaled in the housing 56 a shaft 58 which carries the control lever 55 and carries also a short downwardly extending lever 59 for a purpose later to be described. When the control lever 55 is moved vertically, the lever 59 is rocked in a vertical plane, and when the control lever is swung horizontally from neutral position, designated N in Fig. 5a, to the dash line position F for forward rotation of the spindle or to the dash line position R for reverse rotation of the spindle, it rocks the housing 56 in the cover 57.

The housing 56 has a downwardly extending portion 60 having a bearing portion 61 engaged by a bearing 62 (Fig. 5) which is supported by or forms a part of the cover 57. Below the bearing portion 61 there is secured to the lower end of the extension 60 a short lever 63 which, as clearly shown in Figs. 3 and 5, engages in the groove of a yoke sleeve 64 carrying a yoke 65 which engages in the circular groove of the clutch member 29 which, as before stated, is slidably mounted on the shaft 28. Thus by horizontal rocking of the control lever 55 from the full line position to the dash line position F or R, this clutch member is engaged with either the clutch member 30 or the clutch member 31 for forward or reverse rotation of the work spindle 26, and of course when the control lever is in its neutral position indicated as the N position, the movable clutch member is disengaged from both the clutch members 30 and 31 and the work spindle is then stationary.

Before describing the vertical movements of the control lever 55 and the parts actuated thereby, I will refer to the indexible members of the selecting or preselecting mechanism which members are adapted to be indexed and then actuated to shift the movable elements of the transmission. Although different forms of indexible members may be employed, as will be obvious from a consideration of the Van Hamersveld patent mentioned above, I prefer to employ and have here illustrated the indexible members in the form of spools having on their adjacent ends projections of different lengths, as fully described in the Lange patent referred to above. Inasmuch as the indexible members need not be in the form of spools, these parts are defined in the claims as "mechanical means" adapted to be indexed and then actuated.

The mechanical means, in this instance the two spools which are designated 66 and 67, are splined to a shaft 68 which shaft and associated parts are supported in suitable parts of the cover 57, as clearly shown in Figs. 3 and 4. The spools 66 and 67 are shown spread apart or in their indexing position in Fig. 4 and in their innermost or actuating position in Fig. 3. The shaft 68 is adapted to be rotated or indexed to bring about the indexing of the spools 66 and 67. The spools are provided at their outer ends with circular grooves and the groove of the spool 66 is engaged by a yoke 69 which is integral with a sleeve 70 slidable on a stationary rod 71 carried by the cover 57. The sleeve 70 has a socket which is engaged by the spherical portion 72 of one arm 73 of a bellcrank lever 74 mounted on a bearing pin 75 carried by the cover 57. This lever 74 has an arm 76 the free end of which is provided with a bifurcation or fork engaging in the circular groove of a bushing 77 and in this bushing is housed the ball portion of the relatively short lever 59 previously described as being carried by the shaft 58 to which the control lever 55 is secured.

The other spool 67 has a circular groove which is engaged by a yoke 79 integral with the sleeve 80 slidable upon a stationary rod 81 which, like the companion rod 71, is mounted in the cover 57. The two sleeves 70 and 80 are provided intermediate their ends with slots in which are engaged shoes 82 and 83 which are pivotally supported by an equalizing bar 84 having a centrally arranged bearing pin 85 suitably supported by the cover 57. Thus by reason of this equalizing bar 84 any sliding movement which is imparted to the sleeve 70 in one direction will impart a similar movement to the sleeve 80 in the opposite direction, and due to the fact that the yokes 69 and 79 of the two sleeves are engaged in the annular grooves at the outer ends of the two spools, such spools will be moved simultaneously toward or from each other with an equalized movement. This equalized endwise movement of the spools is imparted thereto by the vertical movement of the control lever 55 by reason of the engagement of the lower end of the short lever 59 with the forked end of the arm 76 of the bell-crank 74 whose arm 73 is connected to the sleeve 70, as already described.

Having described the manner in which the spools are shifted endwise toward and away from each other by the vertical movement of the control lever, I will next briefly describe the manner in which the endwise movement of the spools causes movement to be imparted to the shiftable elements of the transmission, in this instance the three gear cones, to bring about the different rates of movement, in this case twelve in number, which may be imparted to the movable part of the machine tool, in this instance the work spindle.

By reference to Fig. 5 it will be seen that between the spools and the projections thereof there is arranged a pin 86 which is carried by a lever 87 fixed to a vertical shaft 88 which may be supported by the cover 57 in the manner clearly illustrated and described in the Lange patent referred to above. Fixed to the lower end of shaft 88 is a lever 89 which has a spherically shaped outer end, as shown in Fig. 3, which, as illustrated in Fig. 5, is received within the slot of an arm 90 of a sleeve 91 slidable on a rod 92 carried by the cover 57. This sleeve has an arm 93 whose lower end is bifurcated and straddles the gear 39 of the three-step gear cone. Obviously, therefore, any movement given to the pin 86 and to the lever 87 will produce a sliding movement of the three-step gear cone on shaft 34. Also between the spools is a pin 94 which is carried at the outer end of a lever arm 95 having a hub 96 adapted to turn freely on the shaft 88. The free end of the lever 95 carries a shoe 97 which straddles the gear 50 of the rear two-step gear cone of the transmission. It will be noted that when the pin 94 carried by the lever 95 is shifted by the spools, the movement imparted to the lever 95 will shift the rear two-step gear cone. Additionally, there is between the two spools a third pin 98 which is carried by a bent lever 99 (see Fig. 4) which has a hub portion 100 free to rock on the shaft 88. The upper end of the pin 98 forms the bearing for one end of a link 101 (see Fig. 4) whose other end is pivotally connected to a lever 102 fixed to a vertical shaft 103 carried by the cover 57 (see Fig. 6). The lower end of the shaft has fixed to it a lever 104 carrying at its free end a shoe 105 which straddles the gear 51 of the front two-step gear cone. It will be understood that when the pin 98 carried by the bent lever 99 is shifted by the spools the movement of the pin is transmitted by the link 101 to the lever 102 and by the rocking of shaft 103 and of lever 104 movement is then transmitted to the shoe 105 which, as before stated, shifts the front gear cone 51 on the shaft 48.

Thus it will be seen that the projections on the spools, after said spools have been indexed to a predetermined position, will shift the pins and the mechanisms connected thereto and thus the gear cones will be shifted to their various operating positions in the manner fully described in the Lange patent.

I will now refer to the mechanism which more directly involves the present invention, i. e., the indexing of the spools. As a prelude to the detailed description of this mechanism I might say that, in accordance with the present embodiment of the invention, the actual indexing movement of the spools is imparted thereto by power means and means is provided for stopping the spools in their predetermined indexed positions so that when subsequently actuated they will impart the desired rate of movement for a given step of the work cycle or for each of the different steps of the work cycle if that mode of operation is desired. In connection with this power means I prefer to employ a series of electromotive devices each of which is adapted to stop the indexing movement of the spools for a given rate of movement. Additionally, I employ a plurality of switches, preferably in the form of push button switches, which are manually actuated to determine which of these electromotive devices is to be energized to obtain a predetermined rate of movement for the movable part. It is a feature of the present invention that these switches can be individually manually actuated just prior to or during a step of the operating cycle but preferably during the setting up of the machine. The switches may be actuated to effect or bring about the desired rates of movement for the movable part for all of the steps of a work cycle, after which throughout the cycle no further attention need be paid by the operator to the selection of the proper rates of movement other than the manipulation of the main control lever the chief function of which is to control the clutch for forward or reverse movement of the part and to actuate the spools. It might be further stated that if a series of similar work pieces are to be machined, when the operator once sets the required switches, the cycle of operations may be repeated over and over without any further manipulation of the switches or other attention thereto on the part of the operator.

The power means for rotating or indexing the spools consists in this instance of a motor, preferably an electric motor 105, mounted on a support in the form of a small housing 106 which is carried by the cover 57. This motor has at its inner end a pinion 107 which engages a gear 108 fixed to a short shaft 109 one end of which has a bearing in the support 106 and the other end of which has a bearing in a bore of the shaft 68 which supports the spools so that it may freely rotate in the shaft 68 without imparting any movement to it. It might be stated that as long as the machine is in operation this motor 105 remains in operation but its movement is utilized only at intervals when it is desired that the spools be given an indexing movement. The rotative movement of the motor and of the gear 108 is imparted to the shaft 68 when it is to be indexed by the following mechanism:

It will be observed that on the end of the shaft 68 adjacent the motor 105 a head or enlargement 110 is provided. Mounted loosely on this head 110 is a shaft driving member 111 which freely rotates on the head 110 when the shaft 68 is held against rotation in the manner to be referred to and which is designed to frictionally rotate the head 110 and the shaft 68 when the shaft 68 is free to rotate. In this instance, the friction driving means between the member 111 and the head 110 is in the form of spring actuated friction shoes 112 each of which is housed in a socket in the head 110. It will be observed that the short shaft 109 is provided with a ratchet 113 which is adapted to be engaged by a pawl 114 carried by the driving member 111. The hook of the pawl is designed to be moved into interlocking engagement with a tooth of the ratchet by a spring-pressed plunger 115, and as long as the pawl engages a tooth of the ratchet, the driving member 111 will be rotated. Means is provided to disengage the pawl 114 from the ratchet 113, and this means includes an electromotive device, in this instance, a solenoid 116 which is carried by the support 106, as best shown in Fig. 3, and which has a winding in a circuit to be referred to presently and a plunger 117 which normally projects in the path of the tail 118 of the pawl 114 so as to cause the disengagement of the pawl from the ratchet 113 after said driving member 111 which carries the pawl 114 has made one revolution. Thus it will be seen that the mechanism just described forms a one-rotation clutch for giving the shaft 68 a rotative movement.

To stop the indexing movement of the spools for the different rates of movement for the movable part afforded by the transmission, I employ a series of electromotive devices preferably in the form of solenoids 119, the number of solenoids being equal to the number of different rates of movement. As shown in Figs. 3 and 14a, the solenoids 119 are circumferentially spaced around a disk 120 having a single tooth 121, the disk being secured to the shaft 68. The solenoids are equally spaced around the axis of the shaft and they are radially arranged as illustrated in Fig. 14a.

Normally the solenoids 119 are deenergized, in which case the inner ends of the plungers of the solenoids are out of the circular path of movement of the tooth 121 of the disk 120 and they are designed to be separately energized and when one of them is energized the inner end of its plunger will be drawn radially inward so as to project into the path of movement of tooth 121. By reference to Fig. 15 it will be seen that each solenoid 119 consists of a winding 122 and a plunger 123. The inner end of the plunger 123 is made of non-magnetic material and the outer portion of magnetic material so that when the solenoid is energized the plunger will be moved radially inward. The solenoids 119 are secured to a suitable annular support 124 (Figs. 3 and 15) which is carried by the cover 57. It will be observed that the support 124 is provided with an opening 125 for the outer portion of the plunger, and in this opening a spring 126 is provided between the enlarged outer end of the plunger and the solenoid body 127. The function of this spring is to normally hold the plunger in its retracted or outer position, and when the solenoid is energized the plunger is moved radially inward, as before stated, against the pressure of the spring 126 so that as soon as the solenoid is deenergized the spring will restore the plunger to its normal retracted position.

Before describing the manner in which the solenoids are selectively or individually energized, I might state that there is provided on the outer end of the shaft 68, as shown in Figs. 1 and 3, a handwheel 128 by which the spools may be indexed manually if desired, as, for example, during the setup of the machine.

For the energization of the solenoids individually and in the desired sequence and at the proper times during the work cycle, I employ a series of switches including a step-by-step switch 129 shown in Figs. 5, 12, 13, and 14, and a series of manually operable switches preferably in the form of push button switches 130. Before describing the step-by-step switch 129 it might be stated that the push button switches are preferably arranged in horizontal rows, there being in each row as many of these switches as there are rates of movement for the movable part afforded by the transmission and there being as many rows as there are steps in the work cycle.

By reference to Figs. 14, 16, and 17, it will be seen that in this instance the switches 130 are supported by a panel 131 which is carried by the cover 57 so as to be readily accessible to and within sight of the operator when standing in front of the head of the machine. Each of these switches includes a push button plunger 132. These plungers are normally in their outermost positions, and one in each horizontal row is adapted to be pushed inward for the predetermined rate of movement for one step in the work cycle. At the lower right-hand side of Fig. 17 one of the push buttons 132 is shown in its innermost position for the energization of one of the solenoids for a given rate of movement, in this instance for the first step of the work cycle, since the section of Fig. 17 is taken along the upper horizontal row of push button switches.

Each of these switches has a contact portion 133 which is insulated from the push button plunger, and when it is pushed inward to its innermost position it is adapted to engage contact 134 and contact 135. The contact 134, as best shown in Fig. 14, is a short contact individual to a switch whereas contact 135 is a relatively long bar contact which functions for all the switches in a vertical row. It will be understood, of course, that the panel itself will either be formed of insulating material or be suitably insulated from the various contacts 134 and the contact bars 135 as well as the contact portions 133, as is well understood in the art. The buttons 132 of the switches have inward extensions 136 which are frictionally engaged by springs 137 which are carried by the panel to hold them in their innermost or outermost positions and preferably the ends of these springs engage in circular grooves 138 near the inner ends of the plungers so as to positively hold the plungers in their normal outermost positions.

In the normal operation of the machine and during the setup of the machine preliminary to machining a work piece having, let us assume, portions which are to be machined during a work cycle of six steps, the operator will push in one button in each horizontal row of buttons for each step of the work cycle, and this can be done very conveniently and without likelihood of error for the horizontal rows are numbered at the left-hand side of the panel in accordance with the successive steps of the cycle.

After the last work cycle has been completed for a series of similar work pieces to be machined and a new setup is required for new work, the buttons must be restored to their outermost positions. With the present invention this can be done very conveniently for the reason that I provide for each horizontal row of push buttons a restore bar 139 which is horizontally supported by the panel 131, as clearly shown in Fig. 17. This bar has a series of camming portions or teeth 140 and each bar is adapted to be given a movement by a so-called restore button 141, one of which is provided for each step of the work cycle, these restore buttons being arranged in a vertical row near the left-hand end of the panel 131. By depressing the restore button 141 for a given horizontal row of buttons through the medium of a bell-crank 142 pivotally supported on the panel and having a pin and slot connection with the restore bar 139, the bar will be moved to the right as the same is viewed in Fig. 17 so that any button in this horizontal row will be cammed outwardly by one of the camming portions 140 of the bar. When the operator removes his finger from the restore button 141 the bar is immediately restored to its former position, i. e., moved to the left by a spring 143.

Not only are the restore buttons and restore bars useful for restoring the buttons after the last work cycle for a given number of work pieces has been completed, but they are useful also during the setup of the machine as changes may be made in the selection of the rates of movement in order to arrive at the most desirable rate of movement for a given step in the work cycle, and in that even the restore buttons and restore bars are conveniently employed to restore the buttons to their outermost positions.

The step-by-step switch 129 includes a contact bar 144, a row of individual contacts 145, and a bridging contact 146. There are as many of the individual contacts 145 as there are steps in the work cycle, and they and the contact bar 144 will of course be insulated from the the cover 157 by which they are supported. As shown in Fig. 14, the bridging contact engages the contact bar 144 and the left-hand contact 145, and by the mechanism shortly to be described, the bridging contact 146 is adapted to be given a step-by-step movement to bring it successfully into contact with the different individual contacts 145. Obviously the number of step-by-step movements which are given to the bridging contact can be varied and will depend upon the number of steps in the work cycle, and after the last step of the work cycle has been completed, this bridging contact 146 will be restored to its left-hand position shown in Fig. 14.

The control lever 55 is employed to impart the step-by-step movement to the bridging contact 146 of the switch 129. For an understanding of the means by which this is acomplished reference will be had to Figs. 3, 9, 10, 11, 12, and 13. It was previously stated that the bell-crank lever 74 illustrated in Figs. 3 and 4 by the connection of the arm 76 with the short lever 59 causes actuation of the spools 66 and 67 by moving them endwise on the shaft 68. The movement of the bell-crank 74 is utilized in this instance to actuate the step-by-step switch and to accomplish this there is connected to the arm 76 of the bell-crank 74 a link 147 connected to one end of a lever 148 rockably mounted on a bearing pin 149 carried by the cover 57. The other end of the lever 148 has a forked connection to a rod 150 the forward end of which is pivotally connected to a pawl carrier 151 carrying a pivoted actuating pawl 152 which is adapted to engage a ratchet 153. This ratchet is secured to a shaft 154 having a threaded portion 155, this thread having a steep angle and being engaged by a sleeve 156 having a threaded portion engaging the threaded portion 155 of the shaft 154. This sleeve carries the bridging contact 146 of the step-by-step switch 129. Thus each time the control lever is given a downward movement, the ratchet is turned an arcuate distance equal to one tooth, the pawl carrier 151 being moved from the position shown in Fig. 9 to the position shown in Fig. 10, this being sufficient to cause the sleeve 156 to move the bridging contact 146 from one contact 145 to the next contact 145. It might be here stated that there is associated with the ratchet 153 a holding pawl 157 mounted on a bearing pin 158 carried by the cover. A spring tends to move the pawl into ratchet holding engagement so as to hold the ratchet against reverse rotation.

It will be understood that when an upward movement is given to the control lever from its lowermost position the rocking movement of the lever arm 148 will move the pawl carrier 151 from the position shown in Fig. 10 to the position shown in Fig. 9, thus restoring the pawl 152 to its former position.

Carried by one end of the shaft 154 is a dial 159 having spaced numerals on its periphery corresponding to the number of steps of the work cycle, and associated with this dial but mounted on a stationary part of the cover is a pointer 160 (see Fig. 1) which by cooperation with the particular numeral on the dial in line with it will always give a visual indication of the particular step of the work cycle then being carried out or about to be carried out.

It will be noted by reference to Fig. 13 that there is provided a rat trap spring 161 one end of which is supported by the cover 57 and the other end of which is connected to the shaft 154. This spring is wound up during the step-by-step movement imparted to the shaft 154 as the various steps of the work cycle are followed through. It might be here stated that the function of this spring 161 is to rotate the shaft 154 in the reverse direction so as to restore the parts from the position shown in Fig. 13 to the position shown in Fig. 12, when the work cycle has been completed.

To accomplish this result there is arranged below the shaft 154 and preferably supported also by the cover 57 a rod 162 having a knob 163 exposed outside of the cover and accessible to the operator. Its location is seen at the upper left-hand end of Fig. 1 as well as in Figs. 3, 12, and 13. This rod 162 has a threaded portion 164 which extends loosely through a lug 165 integral with the sleeve 156 and beyond the lug 165 the threaded portion 164 of the rod extends into an internally threaded sleeve 166 which is partly supported by the rod and partly by a second lug 167 integral with the sleeve 156. The sleeve 166 has a keyway in which is engaged a pin 168 (see Fig. 13) carried by the second lug 167 of the sleeve 156. This pin holds the sleeve 166 against rotation but the sleeve is free to slide in the bore of the lug 167.

There is secured to the rod 162 a collar 169 which normally engages the inner face of the wall of the cover 57, as illustrated in Figs. 12 and 13, and the rod 162 further has a conically shaped cam portion 170 which normally lies just forwardly or outwardly of the lower ends or tails 171 and 172 of the two pawls 152 and 157 which normally engage the ratchet, as illustrated in Figs. 9 and 10. One end of the sleeve 166 is provided with a shoulder portion 173 which when the last step of the work cycle has been completed is engaged by the lug 165 of the sleeve 156 (as shown in Fig. 13). The sleeve 166 during the set-up of the machine will be set or adjusted to a given position depending upon the number of steps in the work cycle by turning the knob 163, and when the last step of the cycle is initiated, the lug 165 will be brought up against the shoulder 173 of the sleeve 166 as illustrated in Fig. 13. Initially, i. e., when the first step of the work cycle is initiated, the lug 165 will be located away from the shoulder 173 a distance equivalent to the distance of travel of the switch contact 146 over the individual contacts 145. In this instance, the sleeve 166 has been set for a work cycle of six steps since in Fig. 13 the switch contact 146 is engaging the last contact 145 and the lug 165 is up against the shoulder 173 of the sleeve 166.

The work cycle now having been completed, the parts are to be restored to their previous positions and this is accomplished by the operator giving the control lever an additional movement to be described as though the step-by-step switch contact 146 were to be moved for a seventh or additional step of the cycle. This additional movement of the control lever has the effect of again turning the threaded portion 155 of the shaft 154, and this moves forward the sleeve 156, the only effect of this additional forward movement of the sleeve being to cause an inward movement of the rod 162 by reason of the engagement of the lug 165 with the shoulder 173 on the sleeve 166. This movement causes the cam portion 170 of the rod 162 to spread the lower ends 171 and 172 of the two pawls 152 and 157 so as to bring the pawls out of engagement with the ratchet 153, as shown in Fig. 11, and as soon as this occurs the rat trap spring 161 rotates the shaft 154 in the reverse direction to which is was previously turned when giving the step-by-step movements, and the effect of this is to quickly restore the sleeve 156 with its step-by-step switch contact 146 to its original position shown in Fig. 12. During the latter part of this return movement of the sleeve the lug 165 will engage the collar 169 on the rod 162 and move it outwardly up against the wall of the cover, as in Fig. 12, so as to disengage the cam portion 170 from the lower ends of the pawls 152 and 157 and thus allow them to move inwardly in contact with the ratchet 153, as shown in Fig. 10. The parts are now in position for repetition of the steps of the work cycle of the machine tool.

It might be here stated that at the will of the operator, the movable contact of the step-by-step switch can be restored to its initial position by simply bumping the knob 163 on the outer end of shaft 162.

The main control lever 55, in addition to actuating the clutch 29 between the transmission and the source of power, to actuate the spools and to actuate the movable contact of the step-by-step switch, performs one other function, namely, the temporary closing of a switch in the circuit of the solenoid 116. This switch, which is shown in Figs. 3, 4, and 14, is designated 174. It includes two stationary contacts 175 and a bridging contact 176 carried at the right-hand end of a rod 177 supported in bearings 178 on the cover 57, and in this instance arranged in line with the rod 150. When the rod 150 is given a movement to the right as viewed in Fig. 3, as occurs during one portion of the control lever movement to be explained, the rod 150 will move the rod 177 and close the switch 174. It might be here stated, however, that in the normal functioning of the mechanism the switch 174 is closed only momentarily, i. e., just for sufficient time to energize the solenoid 116 and cause the retraction of the plunger 117 thereof so as to allow the one rotation clutch to function. When the rod 150 moves in the reverse direction, the switch is immediately opened by a spring 179 which in this instance is arranged between one of the bearings 178 and a collar on the rod 177.

I will next describe the electrical circuits by which the various electrical devices are caused to function so as to produce the results already stated. Reference will now be had to Figs. 14 and 14a. It will be noted that current is supplied by main conductors 180 and 181 shown at the upper left-hand corner of Fig. 14. In the circuit there is preferably provided a hand switch 182 to render the circuits effective and ineffective. Beyond the hand switch the motor 105 is connected to the main conductors by conductors 183. Likewise, beyond the hand switch 182 one of the conductors, in this instance the positive conductor 180, is connected by conductor 184 to the contact bar 144 of the step-by-step switch 129. The first contact 145 of the step-by-step switch 129 is connected by conductors 185 and branch conductors 186 to the short contacts 134 of the upper row of push button switches 130. In like manner, the second, third, fourth, fifth, and sixth contacts 145 of the step-by-step switch 129 are connected respectively to the short contacts 134 of the second, third, fourth, fifth, and sixth horizontal rows of push button switches 130, these connections being made by conductor 187 and branch conductors 188, conductor 189 and branch conductors 190, conductor 191 and branch conductors 192, conductor 193 and branch conductors 194, and conductor 195 and branch conductors 196. By reference to Figs. 14, 14a, and 16 it will be noted that the contact bar 135 of the first or left-hand vertical row of push button switches 130 corresponding to the lowest rate of movement of the spindle, in this instance 26 R. P. M., is connected by a conductor 197 to one terminal of the winding of the solenoid 119A which positions the spools for the lowest rate of movement, the other terminal of this solenoid being connected by conductor 198 to a conductor 199 connected to the main negative conductor 181.

The contact bar 135 for the second vertical row of push button switches 130 corresponding to the next higher rate of movement, in this instance 34 R. P. M., is connected by a conductor 200 to one terminal of the winding of the next solenoid 119B which positions the spools for the second rate of movement or 34 R. P. M., the other terminal of this solenoid being connected by a conductor 201 to the conductor 199 which is connected to the negative conductor 181 of the current supply circuit. In like manner, the contact bars 135 of the vertical rows of switches corresponding to the third, fourth, fifth, sixth, seventh, eighth, ninth, tenth, eleventh, and twelfth rates of movement are connected to one terminal of the windings of the solenoids 119C, 119D, 119E, 119F, 119G, 119H, 119I, 119J, 119K, and 119L, these connections being made by conductors designated, respectively, 202, 203, 204, 205, 206, 207, 208, 209, 210 and 211. The other terminals of the windings of these solenoids are connected, some to the conductor 198 or to the conductor 201 which conductors, as already explained, are connected to the conductor 199, while the remaining terminals are directly connected to the conductor 199 which leads to the negative side of the current supply circuit.

By referring to Fig. 14 it will be noted that the positive current supplying conductor 180 is connected by a conductor 212 to one terminal of the winding of solenoid 116, the other terminal of which is connected by conductor 213 to one of the stationary contacts 175 of the switch 174, the other stationary contact of which is connected by a conductor 214 to the negative current supplying conductor 181.

The manner in which the actuation of the control lever brings about the proper functioning of the selecting or preselecting mechanism described above will now be explained. Let it be assumed that the work piece is in the machine ready to be machined and that the spindle is stationary for the reason that the main clutch 29 is disengaged. Let it be assumed further that the control lever stands in its middle position as shown in Fig. 5a and in the intermediate dash-line position shown in Fig. 5. Also let it be assumed that the operator has pushed in a plunger in each of the various rows of push button switches for the desired rates of movement for the different steps of the work cycle, that there are six steps in the cycle, and that the operator has turned the knob 163 and the shaft 162 to properly position the sleeve 166 as shown in Fig. 12. The operator will now close switch 182, and of course this switch can remain closed during the entire performance of the machine assuming that a number of similar work pieces are to be machined. Upon the closure of the main switch 182 with the bridging contact 146 of the step-by-step switch in its first position, the proper solenoid will be energized for the rate of movement desired for the first step of the work cycle. This will cause this particular solenoid to move its plunger 123 to its innermost position, as is the case with the solenoid marked 119J in Fig. 14a. The operator now raises the control lever 55 to the uppermost dash-line position shown in Fig. 5, and this causes the closure of the switch 174 which in turn energizes the solenoid 116 withdrawing the plunger 117 thereof to allow the one-rotation clutch to make one rotation. During the rotation of the clutch, the shaft 68 and, accordingly, the disk 120 will rotate until the tooth 121 of the disk engages the plunger of the energized solenoid 119J. Generally, the disk 120 when it is stopped by the engagement of the tooth 121 with the plunger of the solenoid will make less than one complete revolution but nevertheless the one-rotation clutch will complete its revolution and for a portion of the revolution the driving member 111 of the clutch will slip relative to the head 110 of the shaft 68. The spools have now been indexed to the required position for the first step of the work cycle, it being remembered that when this occurs the spools are in their outermost position shown in Fig. 4 so that the indexing of the spools can take place in the manner just described. If the operator simply bumps the lever up from the intermediate position to its uppermost position, the lever will automatically return to said intermediate position by the action of a spring plunger 215 (Fig. 5) and by the action of the spring 179 which opens the switch 174.

Next the operator moves the control lever from its intermediate position to its lowermost position shown in full lines in Fig. 5, and in moving the lever to this position the spools are actuated or moved toward each other on the shaft 68 or from the position shown in Fig. 4 to the position shown in Fig. 3, thus actuating pins 86, 94 and 98 to shift the gear cones in the transmission to the position required for the first rate of movement for the movable part in the first step of the cycle. During this same movement of the lever the pawl 152 is moved from the position shown in Fig. 9 to the position shown in Fig. 10, thus rotating the ratchet 153 a distance of one tooth which rotates the shaft 154 sufficiently to move the bridging contact 146 of the step-by-step switch 129 to engage the next contact 145 corresponding to the second step of the work cycle. The effect of this is to de-energize the previous active solenoid 119J and to energize the solenoid for the next step of the work cycle, it being remembered that as soon as the bridging contact 146 is shifted to the second contact 145 current will flow through the push button switch in the second horizontal row which has been closed to give the desired rate of movement for the second step of the work cycle. The operator now moves the control lever horizontally to engage the main driving clutch for either forward or reverse rotation and the machining operation for the first step of the work cycle will now take place.

At the completion of the first step of the work cycle the control lever is again moved horizontally to neutral position so as to disengage the main driving clutch 29. Then the control lever is raised to its intermediate position shown in Fig. 5 which restores the pawl 152 from the position shown in Fig. 10 to the position shown in Fig. 9, and during this same movement of the control lever the spools are moved outward to the position shown in Fig. 4. Next he will again raise the lever to its uppermost position in Fig. 5 which closes the switch 174 and allows the one-rotation clutch to make its rotation, thus indexing the spools or turning them to a position where the tooth 121 engages the plunger of the then energized solenoid. The above procedure will be repeated for each of the different steps of the work cycle.

Thus it will be seen that for each of the successive steps of the work cycle, all that the operator is required to do is to move the control lever horizontally to disengage the main driving clutch and then move it up to its extreme upper position and then down to its lowermost position, and then again move it horizontally to cause the reengagement of the main clutch. These same operations will be repeated for any number of repetitions of the work cycle.

Above I have described the preferred mode of operation but the precise details of procedure need not be followed since the procedure is susceptible of several modifications. For example, instead of preselecting the rates of movement for a work cycle or a plurality of work cycles, the operator may preselect a rate of movement for a succeeding step while one step of the work cycle is being performed, or, if desired, he may select the rate of movement just before the step is initiated, as by pushing in the plunger of the push button switch for the desired rate of movement.

Also the manipulation of the control lever may be somewhat different from that utilized above. For example, in the above description it was stated that the operator will move the control lever to its lowermost position and then swing it horizontally to cause the main driving clutch to be engaged while the lever is in its lowermost position. This procedure can be modified in the following manner: The operator can move the control lever to its lowermost position and then back to its intermediate position shown in Fig. 5, and then move it horizontally to cause the main driving clutch to be engaged. As a matter of fact, the horizontal movement can be given to the lever when it is in any position (vertically considered) between its lowermost position shown in Fig. 5 and its intermediate position shown in this same figure.

Additionally, the operator, in moving the control lever upwardly from the intermediate position shown in Fig. 5a, may move it to its extreme upward position without stopping it in its intermediate position shown in Fig. 5.

It was stated above that the operator may preselect a rate of movement for the movable part for a succeeding step while one step of the work cycle is being performed, or, if desired, he may select the rate of movement after the termination of one step and just before the next step is initiated, by pushing in the plunger for the push button switch for the desired rate of movement. As a matter of fact, if the operator proceeds in either of the ways just stated it is not essential that he operate the switches in any more than one horizontal row, which, for convenience, may be assumed to be the uppermost horizontal row. For example, let it be assumed that the operator preselects or selects each of the different rates of movement for the different steps of the work cycle, either while one step is in progress or just before a step is initiated. He will then initiate the first step by pushing in a button in the upper horizontal row. Then to obtain the speed for the next step he will simply bump the knob 163 to spread the pawls 152 and 157 so as to restore the bridging contact 146 to its initial position as shown in Fig. 12, then push in the restore button for the uppermost horizontal row to restore to its previous position the plunger of the push button switch first initiated, and then push in the button for the switch of the uppermost row which will give the rate of movement desired for the next step of the work cycle. This can be repeated for all the different steps of the work cycle with the operator simply utilizing the switches in one horizontal row. This procedure can be utilized to advantage particularly if the operator is required to machine only a single work piece or a plurality of work pieces of different forms each of which requires rates of movement different than those required for the other forms.

Accordingly, I regard it within the scope of my invention to provide a selecting or preselecting mechanism which operates in accordance with the principle of the present invention but utilizing a single row (or group) of push button switches for the control of the different solenoids 119 to obtain the different rates of movement for the various steps of the work cycle. In that case, the step-by-step switch can be eliminated since that switch is utilized and finds its utility only in the arrangement illustrated wherein there is a horizontal row (or group) of push button switches for each of the various steps of the work cycle.

Finally it might be stated that spring points may be employed for holding the various adjustable parts in their adjusted positions, but as these are well known in the art, they have not been illustrated in the drawings.

Although I have illustrated the preferred construction and one which operates with high efficiency, I do not desire to be confined either to the electrical or to the mechanical details of the herein illustrated selecting or preselecting mechanism but aim in my claims to cover all modifications which do not involve a departure from the spirit and the scope of the invention.

Having thus described my invention, I claim:

1. In a machine tool having a movable part, a change speed transmission for moving said part at different rates and including shiftable elements, a mechanism operatively associated with said shiftable elements and indexible to select or preselect the different rates of movement for said part and actuatable to obtain the selected or preselected rates of movement therefor; a member indexible with said mechanism and provided with an abutment portion, a plurality of stops adapted to cooperate with said portion to position said member and said mechanism in various predetermined indexed positions correlated to the different rates of movement of said part, electromotive devices for actuating said stops, electric circuits for said devices, and separate manually actuated switches for said devices arranged in said circuits.

2. In a machine tool having a movable part, a change speed transmission for moving said part at different rates and including shiftable elements, a mechanism operatively associated with said shiftable elements and indexible to select or preselect the different rates of movement for said part and actuatable to obtain the selected or preselected rates of movement; a member indexible with said mechanism and provided with an abutment portion, a plurality of spaced stops arranged circumferentially of said member and adapted to cooperate with said portion to position said member and said mechanism in various predetermined indexed positions correlated to the different rates of movement for said part, electromotive devices for actuating said stops, electric circuits for said devices, and separate manually actuated switches for said devices arranged in said circuits.

3. In a machine tool having a movable part, a change speed transmission for moving said part at different rates and including shiftable elements, a mechanism operatively associated with said shiftable elements and indexible to select or preselect the different rates of movement for said part and actuatable to obtain the selected or preselected rates of movement therefor; a member indexible with said mechanism and provided with an abutment portion, a plurality of stops adapted to cooperate with said portion to position said member and said mechanism in various predetermined indexed positions correlated to the different rates of movement for said part, electromotive devices for actuating said stops, electric circuits for said devices, a plurality of groups of manually actuated switches, with the number of groups corresponding to the number of operative steps in a complete work cycle and with the number of switches in each group corresponding to the number of different rates of movement for said part, and switch means for placing selectively each group of switches in said circuits.

4. In a machine tool having a movable part, a change speed transmission for moving said part at different rates and including shiftable elements, a power source, means for connecting and disconnecting said power source to and from said transmission, a control member for said means, a mechanism operatively associated with said shiftable elements and indexible to select or preselect the different rates of movement for said part and actuatable to obtain the selected or preselected rates of movement therefor; a member indexible with said mechanism and provided with an abutment portion, a plurality of stops adapted to cooperate with said portion to position said member and said mechanism in various predetermined indexed positions correlated to the different rates of movement for said part, electromotive devices for actuating said stops, electric circuits for said devices, a plurality of groups of manually actuated switches for said devices with the groups of switches corresponding in number to the number of operative steps in a complete work cycle and with the switches in each group corresponding in number to the number of different rates of movement for said part, switch means for placing each group of switches selectively in said circuits, and operative connections between said switch means and said control member.

5. In a machine tool having a movable part, a change speed transmission for moving said part at different rates and including shiftable elements, a mechanism operatively associated with said shiftable elements and indexible to select or preselect the different rates of movement for said part and actuatable to obtain the selected or preselected rates of movement therefor, a power drive for indexing said mechanism and including releasable means for controlling said drive to impart a predetermined movement to said mechanism; said means including an electromotive device and a switch for controlling said device, a member indexible with said mechanism and provided with an abutment portion, a plurality of stops adapted to cooperate with said portion to position the said member and said mechanism in various predetermined indexed positions correlated to the different rates of movement for said part, electromotive devices for actuating said stops, electric circuits for said last devices, a plurality of groups of separate manually actuated switches for controlling said last devices, said groups corresponding in number to the number of operative steps in a work cycle with the switches in each group corresponding in number to the number of different rates of movement for said part, switch means for selectively placing each of said groups of switches in said circuits, a control member, and operative connections between said control member and said first named switch and said switch means.

6. In a machine tool having a movable part, a change speed transmission for moving said part at different rates and including shiftable elements, a power source, means for connecting and disconnecting said power source to and from said transmission, a control member for said means, a mechanism operatively associated with said shiftable element and indexible to select or preselect the different rates of movement for said part and actuatable to obtain the selected or preselected rates of movement therefor, operative connections between said mechanism and said control member for actuating said mechanism, a power drive for indexing said mechanism including releasable means for causing said drive to impart a predetermined movement to said mechanism; said last named means including an electromotive device and a switch for controlling the same, operative connections between said switch and said control member, a member indexible with said mechanism and provided with an abutment portion, a plurality of stops adapted to cooperate with said portion to position said last member and said mechanism in various predetermined indexed positions correlated to the different rates of movement for said part, electromotive devices for actuating said stops, electric circuits for said devices, a plurality of groups of separate manually actuated switches for controlling said last devices, said groups corresponding in number to the number of operative steps in a work cycle with the switches in each group corresponding in number to the number of different rates of movement of said part, switch means for selectively placing each of said groups of switches in said circuits, and operative connections between said switch means and said control member.

7. In a machine tool having a movable part, a change speed transmission for moving said part at different rates and including shiftable elements, a mechanism operatively associated with said shiftable elements and indexible to select or preselect the different rates of movement for said part and actuatable to obtain the selected or preselected rates of movement therefor, a power drive for indexing said mechanism including releasable means for imparting a predetermined movement thereto; said means including an electromotive device, a switch for controlling said device, a member indexible with said mechanism and provided with an abutment portion, a plurality of stops adapted to cooperate with said portion to position said member and said mechanism in various predetermined indexed positions correlated to the different rates of movement for said part, electromotive devices for actuating said stops, electric circuits for said last devices, a plurality of groups of separate manually actuated switches for controlling said last devices, said groups corresponding in number to the number of different operative steps in a work cycle with the switches in each group corresponding in number to the number of different rates of movement for said part, switch means for selectively placing each of said groups of switches in said circuits, a control member, and operative connections between said control member and said switch means and said first named switch such that movement of said control member sequentially actuates said switch means and said first named switch.

8. In a machine tool having a movable part, a change speed transmission for moving said part at different rates and including shiftable elements, indexible means operatively associated with said shiftable elements for selecting or preselecting the different rates of movement for said part, electrical means for controlling indexing movement of said last means, said electrical means including a plurality of groups of manually actuated switches with the groups corresponding in number to the number of different operative steps in a work cycle, a step by step movable switch means for selectively rendering operative each of said groups of switches, mechanism for giving said switch means a step by step movement, and manually operable means operatively associated with said mechanism for restoring said switch means from any position it may be in to its initial position.

JOHN J. N. VAN HAMERSVELD.